US010795328B2

(12) United States Patent
Foisy et al.

(10) Patent No.: US 10,795,328 B2
(45) Date of Patent: Oct. 6, 2020

(54) METHOD OF CONFIRMING REMOTE PROGRAMMING OF DEVICE BY MONITORING STATION

(71) Applicant: Tyco Safety Products Canada Ltd., Concord (CA)

(72) Inventors: Stephane Foisy, Udora (CA); Derek Smith, Maple (CA); Dwayne Richard Salsman, Alliston (CA); Trevor E. Green, Toronto (CA)

(73) Assignee: TYCO SAFETY PRODUCTS CANADA LTD., Ontario (CA)

( * ) Notice: Subject to any disclaimer, the term of this patent is extended or adjusted under 35 U.S.C. 154(b) by 283 days.

(21) Appl. No.: 15/897,948

(22) Filed: Feb. 15, 2018

(65) Prior Publication Data

US 2019/0025777 A1    Jan. 24, 2019

Related U.S. Application Data

(60) Provisional application No. 62/536,166, filed on Jul. 24, 2017.

(51) Int. Cl.

| G05B 15/02 | (2006.01) |
| H04L 9/32 | (2006.01) |
| H04L 29/06 | (2006.01) |
| H04L 29/08 | (2006.01) |
| G08B 29/12 | (2006.01) |
| H04L 9/08 | (2006.01) |
| H04L 29/12 | (2006.01) |
| G08B 17/00 | (2006.01) |

(52) U.S. Cl.
CPC .............. *G05B 15/02* (2013.01); *G08B 29/12* (2013.01); *H04L 9/0838* (2013.01); *H04L 9/0869* (2013.01); *H04L 9/3239* (2013.01); *H04L 63/0428* (2013.01); *H04L 63/0876* (2013.01); *H04L 63/18* (2013.01); *H04L 67/12* (2013.01); *G05B 2219/2642* (2013.01); *G08B 17/00* (2013.01); *H04L 61/6022* (2013.01)

(58) Field of Classification Search
CPC .... G08B 25/00; G08B 25/002; G08B 25/008; G08B 25/014; G11C 16/34; G11C 16/3436; G11C 16/3454; G11C 16/3459
See application file for complete search history.

(56) References Cited

U.S. PATENT DOCUMENTS

| 6,950,863 | B1 * | 9/2005 | Pham | ...................... H04L 67/02 709/220 |
| 6,986,132 | B1 * | 1/2006 | Schwabe | ................... G06F 8/52 717/166 |
| 7,956,740 | B2 * | 6/2011 | Myers | .................... G08B 25/14 340/541 |

(Continued)

*Primary Examiner* — Lynn D Feild
*Assistant Examiner* — Richard A McCoy
(74) *Attorney, Agent, or Firm* — Arent Fox LLP

(57) ABSTRACT

A method and system for processing information from a control panel in a building management system validates programming data of the control panel and then a monitoring station responding to the information from the control panel if its programming data was validated. A server system can be used for this validation. The proposed system can provide a lightweight system for validation to avoid problems arising from incorrectly configured panels sending false alarms to monitoring stations.

20 Claims, 5 Drawing Sheets

(56) References Cited

U.S. PATENT DOCUMENTS

| | | | | |
|---|---|---|---|---|
| 2003/0061487 A1* | 3/2003 | Angelo | ............... | G06F 21/6209 |
| | | | | 713/176 |
| 2003/0192033 A1* | 10/2003 | Gartside | ................... | G06F 8/61 |
| | | | | 717/126 |
| 2006/0277414 A1* | 12/2006 | Kotani | .................... | G06F 21/32 |
| | | | | 713/189 |
| 2014/0196134 A1* | 7/2014 | Yamaguchi | ............. | G06F 21/44 |
| | | | | 726/7 |

\* cited by examiner

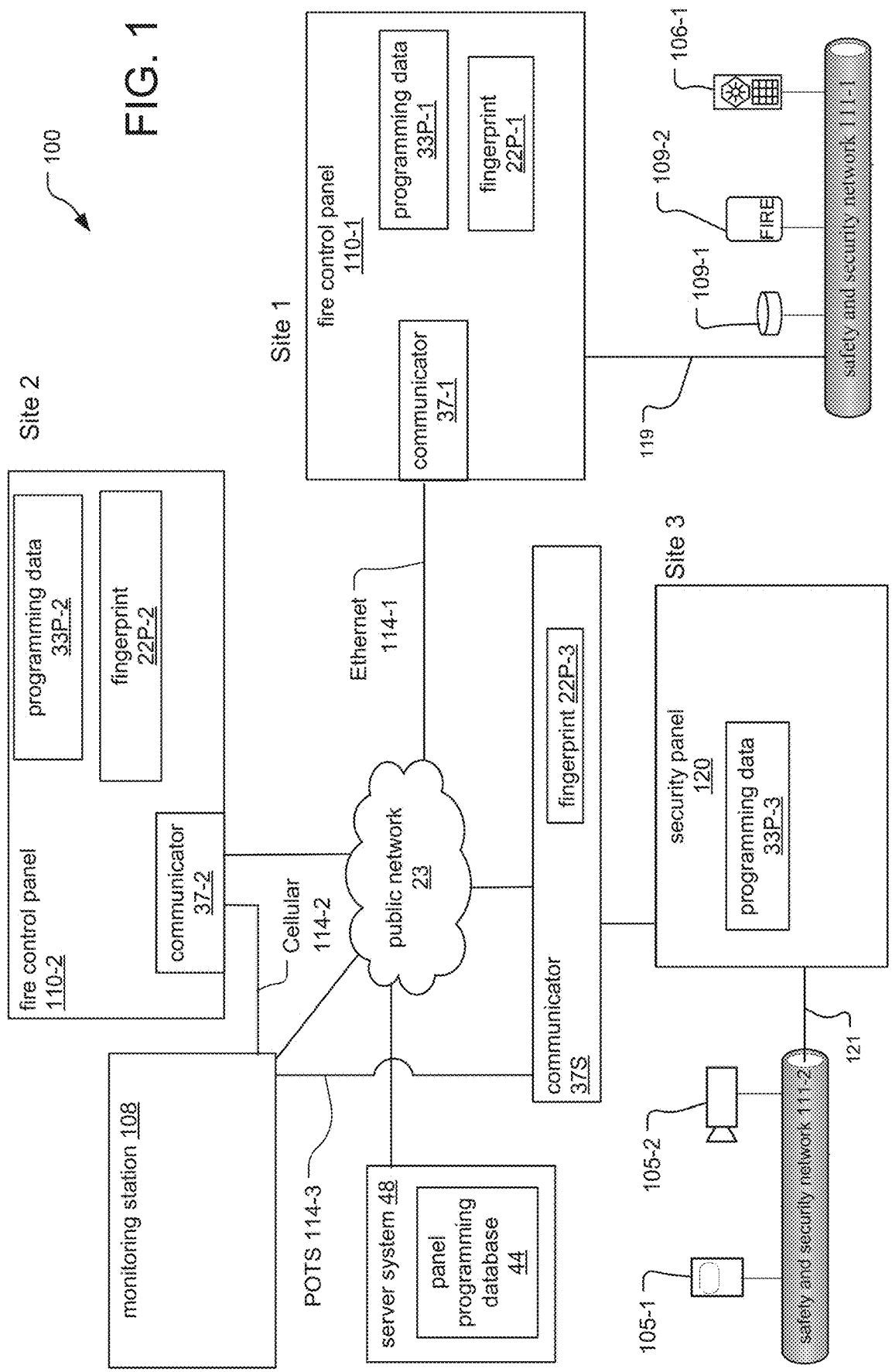

| panel programming database 44 | | |
|---|---|---|
| panel ID 110-1 | fingerprint 22S-1 | programming data 33S-1 | Site 1 |
| panel ID 110-2 | fingerprint 22S-2 | programming data 33S-2 | Site 2 |
| panel ID 120 | fingerprint 22S-3 | programming data 33S-3 | Site 3 |

30-1, 30-2, 30-3

33S-3-1 — customer acct #: 2145
33S-3-2 — panel communication ID: 888-333-1111
33S-3-3 — panel FW: v1.02
33S-3-4 — panel S/N: 25520A
33S-3-5 — panel street location: 2 shore drive, anytown, MA
33S-3-6 — panel coordinates: 42.3601° N, 71.0589° W
33S-3-7 — routine system maintenance: 0x2
33S-3-8 — monitoring station communication ID: 888-333-3333
...

FIG. 2A

METHOD OF CONFIRMING REMOTE PROGRAMMING OF DEVICE BY MONITORING STATION

RELATED APPLICATIONS

This application claims the benefit under 35 USC 119(e) of U.S. Provisional Application No. 62/536,166 filed on Jul. 24, 2017, which is incorporated herein by reference in its entirety.

BACKGROUND OF THE INVENTION

Building management systems such as building automation systems, fire alarm systems and intrusion systems are often installed within a premises such as commercial, residential, or governmental buildings. Examples of these buildings include offices, hospitals, warehouses, multi-unit dwellings, schools or universities, shopping malls, government offices, and casinos. The building management systems generally include building control panels that function as system controllers for distributed sensors, actuators and hybrid sensor/actuator devices.

For example, the fire alarm systems will typically include fire control panels, fire detection/initiation devices and alarm notification devices. The fire detection/initiation devices and alarm notification devices are installed throughout the buildings and connect to the panels. These devices communicate over a local circuit such as a safety and security network, which in turn connects to the fire control panel. Some examples of fire detection/initiation devices include smoke detectors, carbon monoxide detectors, flame detectors, temperature sensors, and/or pull stations (also known as manual call points). Some examples of fire notification devices include speakers, horns, bells, chimes, light emitting diode (LED) reader boards, and/or flashing lights (e.g., strobes).

The fire detection devices monitor the buildings for indicators of fire. Upon detection of an indicator of fire such as smoke or heat or flames, the device is activated and a signal is sent from the activated device over the safety and security network to the fire control panel. The fire control panel then initiates an alarm condition by activating audio and visible alarms of the fire notification devices. Additionally, the fire control panel will also send the indications of fire as alarm information to a monitoring station, which will notify the local fire department or fire brigade.

In a similar vein, the security systems typically include security panels and monitoring devices, where the monitoring devices detect indications of intrusions and unauthorized access at or within the building and report to the security panel. The monitoring devices of the intrusion systems often include motion sensor devices, surveillance camera devices, and door controllers that communicate with the intrusion panel over a safety and security network and might also control the door locking/unlocking. Motion sensor devices can detect intrusions and unauthorized access to the premises, and send indications of the intrusions to the security panel. The surveillance camera devices capture video data of monitored areas within the premises, and door controllers provide access to perimeter and/or internal doors, in examples. Additionally, the security panel will also send the indications of intrusions as intrusion information to a monitoring station.

Building automation systems will typically include one or more building automation control panels and sensors, actuators, and/or and hybrid sensor/actuator devices. These devices control and monitor the physical plant aspects of a building and aspects of business-specific electrical, computer, and mechanical systems. These devices send sensor data that includes information regarding the physical plant to the building automation control panels. The physical plant typically includes heating, ventilation, and air conditioning (HVAC) systems, elevators/escalators, lighting and power systems, refrigeration and coolant systems, and air and/or water purification systems, in examples. Business-specific systems include computer systems, manufacturing systems that include various types of computer-aided machinery and test equipment, and inventory control and tracking systems, in examples.

The monitoring stations will typically monitor multiple building management systems for status information reported from the building control panels of these systems. The monitoring stations process the status information and then notify the proper authorities. Monitoring stations are often required by regulations, making them a standard component of many building management systems, regardless of age or manufacturer of the components of these systems. These monitoring stations can be administered by a third party company, the same company that provides or manufactures the building management systems, or a public agency, among examples.

Many different types of information are sent between the building control panels and the monitoring station. The information includes alarm information sent from fire control panels, intrusion information sent from security panels, sensor data sent from the building automation control panels, and operational information of the panels, in examples. Operational information includes state information of the panels, handshaking signals between the panels and the monitoring stations, and connection data of a communications link between the panels and monitoring station, in examples. In addition, the information includes customer site information such as the location (e.g. street address) at which the panels are installed, and other customer-specific information of a sensitive or confidential nature. In examples, this information includes names and addresses of individuals and their telephone numbers, account numbers and personal identification numbers (PIN), alarm codes used to arm and disarm security panels, and possibly other sensitive information. The information also includes information sent from the monitoring station to the building control panels, such as operational state of the monitoring station.

SUMMARY OF THE INVENTION

After an installer physically installs or prepares to install the control panel at its customer site, the installer initializes the control panel so that the panel can load its programming data (if it exists) and will also typically directly program the customer site information into the panel. Once the control panel initializes, the control panel loads and executes its programming data to become operational.

It is not uncommon for this installation process to be interrupted at some stage. The installer may encounter problems installing the specific panel. Possibly there is some issue with its firmware. On the other hand, the installer could simply have initially chosen the wrong make/model panel for the installation. As a result, the installer must now uninstall the wrong panel and install the correct panel model. And, there are numerous other scenarios under which a panel might be partially installed and configured and then returned to the installer's truck and/or warehouse.

The problem that arises does not concern that the panel that was actually installed. Presumably, it was probably configured and was operational at the end of the installer's job. Instead, the problem concerns those panels that were partially configured/programmed and then returned to the installer's truck, for example. These panels were possibly partially or fully programmed with information associated with their initial, but aborted, installation. For example, those panels may contain customer site information from the aborted installation. When those panels are inevitably installed at a subsequent site, probably for a different customer, they may still be programmed with operation or customer site information associated with the aborted installation. As a result, when those panels enter an alarm state, in the case of fire alarm system, for example, and contact the monitoring station, they may provide the wrong information such as customer, or address, or account number.

In this situation, the programming state of the control panel has become out of synchronization with the programming state of record for the panel at that site. And, there are still other scenarios where a given panel may acquire invalid or incorrect programming data.

The proposed system can provide a lightweight system for validating the programming data of a control panel of a building management system. Programming data encompasses such things as the firmware version that the panel is executing, alarm information, operational information, and/or customer site information. The system is lightweight in that does not require reprogramming (e.g. replacement) of the programming data at the control panel every time the control panel is initialized/powered up. Instead, the programming data is validated, and only then will the monitoring station be able to respond to the information sent from the control panel, in one example.

In general, according to one aspect, the invention features a method for processing information from a control panel in a building management system. The method comprises validating programming data of the control panel and then a monitoring station responding to the information from the control panel if its programming data was validated.

In embodiments, validating the programming data comprises the control panel sending a value representing the programming data and a server system matching the value to a stored value representing stored programming data for the same control panel.

Preferably, upon failing to validate the programming data of the control panel, stored programming data is sent to the control panel, and the control panel updates its programming data with the received programming data.

In some cases, the control panel calculates the value representing the programming data of the control panel in response to modification of and/or updates to its programming data.

In other cases, a communicator connected to the control panel calculates the value.

The programming data of the control panel can be validated during initialization of the control panel, and wherein the initialization resumes after the programming data is validated. The validation can also be accomplished periodically.

In general, according to another aspect, the invention features a system for processing information from a control panel in a building management system. This system comprises a server system that validates programming data of the control panel and a monitoring station that responds to the information from the control panel once the server system has validated the programming data.

In general, according to another aspect, the invention features a method of operation of a control panel in a building management system. This method comprises during initialization or periodically validating programming data of the control panel and then resuming initialization or operation if the programming data was validated.

In general, according to still another aspect, the invention features a control panel in a building management system. It comprises a microcontroller storing programming data of the panel and a communicator for communicating a fingerprint corresponding to the programming data to a server system.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 1 is a block diagram of a monitoring station that communicates with control panels of various building management systems, where the monitoring station also communicates with a server system that validates the programming data of the control panels;

FIG. 2A is a block diagram showing a panel programming database of the server system, where the database is used by the server system to validate the programming data of the control panels;

DETAILED DESCRIPTION OF THE PREFERRED EMBODIMENTS

Figure 2B:
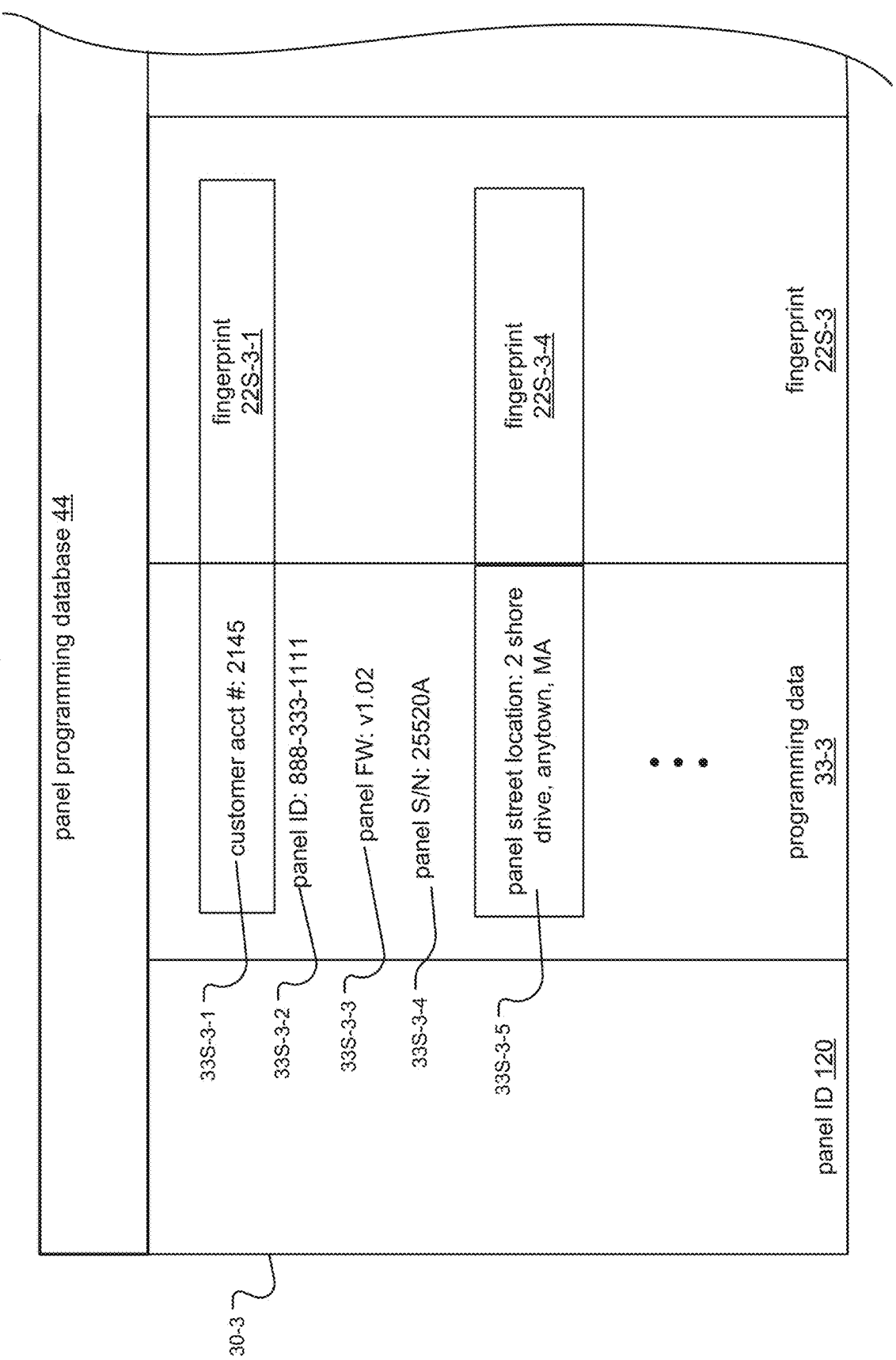
FIG. 2B is a block diagram showing an alternate implementation of the panel programming database.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 shows an exemplary scenario in which different building control panels of different building management systems 100 communicate with a monitoring station 108.

In the illustrated example, a security panel 120, and two fire control panels 110-1 and 110-2 are shown as different examples of building control panels. Each of the panels communicate over a different communications link 114 with the monitoring station 108. The control panels 110, 120 are also communication with a server system via a public network 23, in the typical example. The fire control panels 110-1 and 110-2 and security panel 120 are installed at different customer sites Site1, Site2, and Site3, respectively.

The server system 48 and monitoring station 108 also communicate with one another over the public network 23. In another example, the monitoring station 108 and server system 48 might be connected to a local or enterprise network, which in turn connects to the public network 23. The server system 48 includes a panel programming database 44.

Each of the control panels include programming data 33 that defines the operational state (e.g. programming state) when the control panels load and execute the programming data 33. This programming data includes the machine instructions or firmware that the microcontrollers of the panel execute. It also includes more specific information including operational information and customer site information.

In general, the programming data 33 includes information that uniquely identifies each control panel and enables the control panels to communicate with the monitoring station 108. This information typically includes a serial number of the panel, information that identifies the customer name and location/address at which the panel is installed, and communication identifiers for the control panel and the monitoring station. When the communications link is a POTS link 114-3, for example, the communication identifier for the control panel is the telephone number of a local telephone system to which the control panel is tied, and the identifier for the monitoring station 108 is a telephone number of the monitoring station.

The programming data also includes operational information, which in this context can include specific information concerning and identifying the panels such as media access control address (MAC address), internet protocol (IP) addresses, subscriber identification module (SIM) card numbers and any Dialed Number Identification Service (DNIS) information.

In addition, the programming data also includes customer site information, which includes information such as the location (e.g. street address) at which the panels are installed, and other customer-specific information of a sensitive or confidential nature such as names and addresses of individuals and their telephone numbers, account numbers and personal identification numbers (PIN), alarm codes used to arm and disarm security panels, and possibly other sensitive information.

In the illustrated example, the panels utilize communicators 37 to maintain the communications with the monitoring station 108. These communicators 37 can be integrated within the control panels or be standalone components. The standalone communicators 37S connect to the panels and function as an interface between the panels and the particular communications link that connects those panels to the monitoring station 108.

Different communication links are shown. For example, fire control panel 110-2 communicates with the monitoring station 108 via a cellular data link 114-2. On the other hand, fire control panel 110-1 communicates with the monitoring station 108 via the public network 23 and an Ethernet link 114-1. Finally, security panel 120 connects to standalone communicator 37S using a local phone "tie"/connection, and the standalone communicator 37S, in turn, connects to the monitoring station via a Plain Old Telephone Services (POTS) link 114-3.

In this way, information can be transmitted between the panels 110, 120 and the monitoring station 108. This information typically encompasses alarm information sent from fire control panels, intrusion information sent from security panels, sensor data sent from the building automation control panels, and operational information of the panels, in examples. Operational information includes state information of the panels, handshaking signals between the panels and the monitoring stations, and connection data of a communications link between the panels and monitoring station, in examples. In addition, the information includes customer site information.

According to the invention, in one implementation, the control panels 110, 120 further each maintain a synchronization or fingerprint value 22P within the control panels that is typically accessible by the microcontrollers that operate the panels. The fingerprint 22P represents the programming data 33 of its control panel, and therefore the programming state of the control panel.

In some implementations, however, the fingerprint values 22P may not be maintained by the control panels, per se. Some legacy control panels, or control panels manufactured by competitors, might not be capable of maintaining a fingerprint value 22P within the control panels. Instead, the standalone communicator 37S is provided for such panels. The standalone communicator 37S maintains the fingerprint value 22P representing the programming data 33P of the control panel to which the standalone communicator 37S connects. The standalone communicator 37S communicator might also support the ability to calculate the fingerprint 22.

In yet another example, the communicator 37 is an add-on module that is added to a legacy panel or even a more modern, microcontroller-based panel. This add-on module can augment the capabilities of the panels by supporting newer/emerging communications links such as 5G and Long Term Evolution (LTE), in examples.

Also, in more detail, fire control panel 110-1 includes built-in communicator 37-1, includes programming data 33P-1, and maintains fingerprint 22P-1 that represents the programming data 33P-1. Fire control panel 110-3 includes built-in communicator 37-2, includes programming data 33P-2, and maintains fingerprint 22P-2 that represents the programming data 33P-2. Security panel 120 includes programming data 33P-3. Standalone communicator 37S maintains fingerprint 22P-3 that represents the programming data 33P-3 of the security panel. Here, the "P" suffix of the programming data 33P and fingerprint 22P indicate programming data within the control panel and a fingerprint value within/on behalf of the programming data of the control panel.

To illustrate specific implementation details, fire control panel 110-1, for example, is shown connected to safety and security network 111-1. Fire detection/initiation devices 109 on the safety and security network 111-1 detect indications of fire, and send alarm information 119 as an example of information sent to fire control panel 110-1. Fire detection/initiation devices 109 such as smoke detector 109-1 and pull station 109-2 are shown. Upon detecting the indications of fire, the fire detection/initiation devices 109 also signal alarm notification devices 106 such as strobe 106-1.

To illustrate further implementation details, security panel 120 is shown connected to safety and security network 111-2. Monitoring devices 105 on the safety and security network 111-2 detect intrusions, and send intrusion information 121 as an example of information sent to security panel 120. Monitoring devices 105 such as motion sensor 105-1 and surveillance camera 105-2 are shown.

The communications between the control panels, monitoring station 108, and server system 48/database 44 might also be encrypted or otherwise require security challenges. Such a capability prevents the misconfiguration/compromising of the building management systems.

The building management systems may also operate as a "local only system." This can occur when the customer/building owner has deactivated the monitoring service (did not renew contract, change provider, etc.). In this way, the control panels will locally react to fire, burglary or other events and alert building occupants, but the information normally reported to the monitoring station will not be communicated to the monitoring station 108 to avoid false dispatch of first responders. The process of review and check-in by the control panel to the server system 48 continues to apply as the monitoring service may be reactivated in the future (new home owner, etc.).

In any event, of particular relevance here, the fingerprints 22P are used to validate the state of the programming data that is stored in each of the panels 110, 120. In the illustrated embodiment, this validation is performed using the server system 48. The server system stores a fingerprint 22S associated with each of the panels. The server system 48 then compares that fingerprint 22S to a fingerprint 22P sent by or on behalf of the control panels.

In some examples, these fingerprints 22P are sent by the control panels directly to the server system 48 via the public network 23. In other cases, the fingerprints 22P are sent to the monitoring station 108 and then forwarded to the server system 48.

These transmitted fingerprints are used to validate the programming data 33 of the control panels. The monitoring station 108 can respond to information, such as alarm information, sent by the control panels, when the programming data 33 of the control panels have been validated against fingerprints stored in the panel programming database 44 for each of the panels.

FIG. 2A shows an example implementation of the panel programming database 44.

The database 44 has an entry 30 for each control panel. Exemplary fields within each entry include a panel ID, a stored fingerprint 22S, a stored instance of programming data 33S, and a description. The stored instance of programming data 33S and its fingerprint 22S within the database 44 is the programming data 33S of record for its associated control panel.

Entries 30-1, 30-2, and 30-3 correspond to fire control panel 110-1, fire control panel 110-2, and security panel 120, respectively. Here, the "S" suffix of the programming data 33S and fingerprint 22S indicate stored instances of the programming data and fingerprint within the database 44 for the control panel.

The fingerprint 22 can take many different forms. In one example, the fingerprint 22 is a generated random number. The fingerprint 22 might additionally include the panel ID/serial number of the control panel, and routine system maintenance information, in examples. The fingerprint 22 also contain or encompass other values such as firmware version, status or RSM (routine system maintenance) and the server system 48 may be able to request status/firmware, RSM updates as well as other functions.

The server system 48 recalculates the stored fingerprint 22S whenever the stored programming data 33S is modified or updated. In one example, the stored fingerprint 22S is a generated random number. The stored fingerprint 22S might additionally include the panel ID/serial number of the server system 44.

More detail for stored programming data 33S-3 of security panel 120 is also shown. For example, programming data 33S-3-1 is the customer account number; 33S-3-2 is a panel communication ID (e.g. 888-333-1111 for a POTS 114-3 link); 33S-3-3 is a panel firmware version; 33S-3-4 is a panel serial number (S/N); 33S-3-5 is a panel street location; 33S-3-6 are panel coordinates; 33S-3-7 is a routine system maintenance value; and 33S-3-7 is a monitoring station communication identifier (e.g. 888-333-3333 for a POTS 114-3 link).

If the control panel/communicator is not able to access or otherwise contact the server system 48 (there could be many reasons for such a situation: database offline, power outage, or even illicitly compromising reasons) to validate the fingerprints, there is a timeout. Once the timeout expires, the control panels will use their local programming data 33P and continue and send alarm signals and information to the monitoring station 108. In some embodiments, extra information is provided to the monitoring station 108 to indicate the programming data 33P was not validated and that proper steps should be taken by the monitoring station in its response. In one example, the monitoring station dispatches maintenance personnel in response to the alarm from a non-validated panel. In other cases, the monitoring station reinitiates the synchronize routine to a full security dispatch if the site is of higher security.

FIG. 2B shows another exemplary implementation of the panel programming database 44. More detail for entry 30-3 for panel ID 120 (i.e. security panel 120) is shown.

Here, the database 44 supports different levels or tiers of fingerprints 22S-3. At a high level, as in FIG. 2A, fingerprint 22S-3 operates as a global synchronization value for tracking any changes to the stored programming data 33S-3. In addition, fingerprints 22S-3-1 and 22S-3-4 represent individual fields/data items 33S-3-1 and 33S-3-5 within the stored programming data 33S-3. Such a feature enables finer control over detecting and tracing changes within the programming data 33S-3, and also limits the amount of data traffic between control panel and monitoring station. It is important to note that to properly synchronize the programming data 33P of the control panel with the stored programming data 33S, the same ability to provide per-item fingerprints 22P at the control panel or on behalf of the control panel would also have to be implemented.

Figure 3:
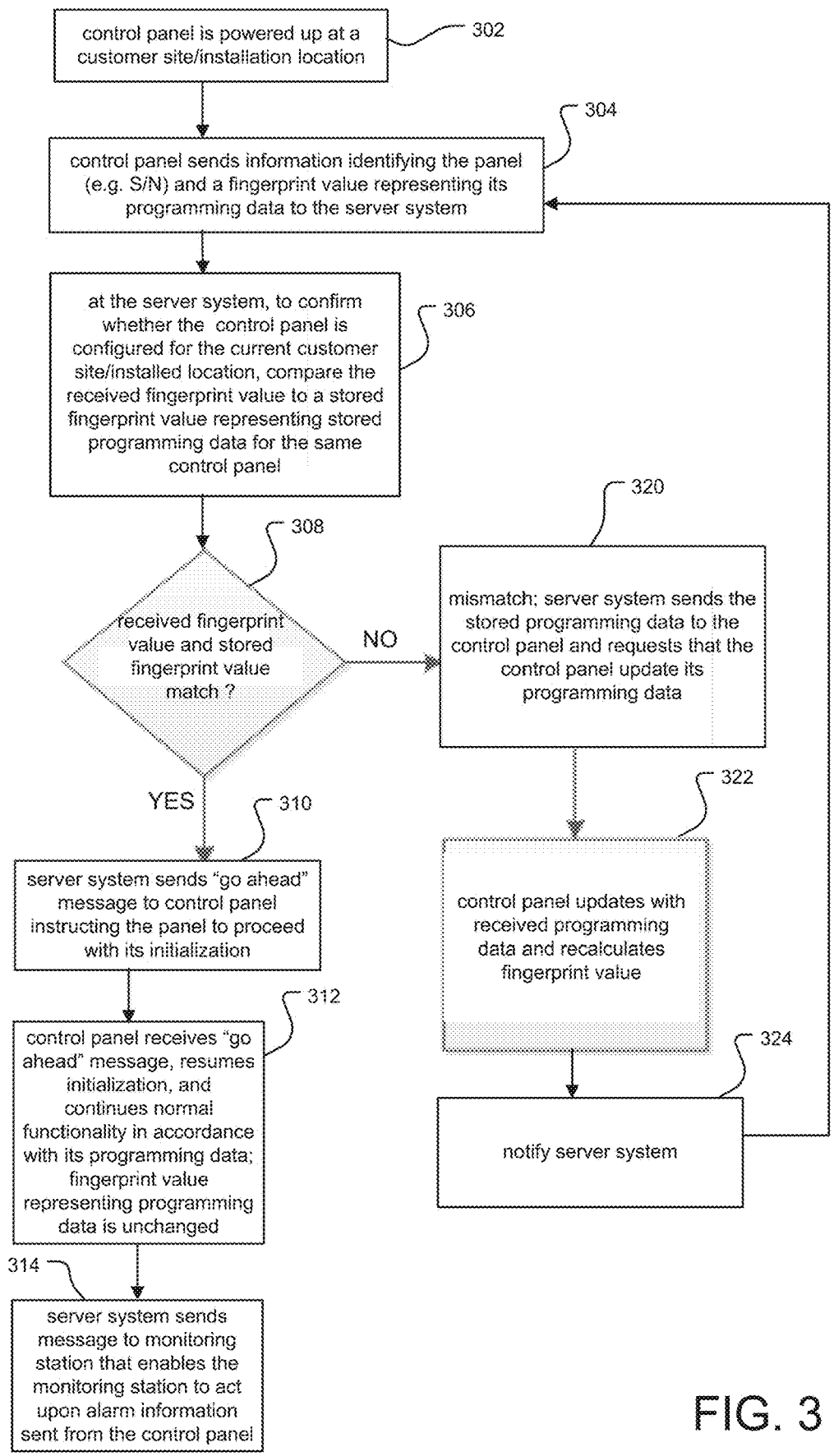
FIG. 3 is a flow diagram showing a method for processing information sent from a control panel upon initialization of the control panel, according to the present invention.

FIG. 3 describes a method for validating programming data 33P of an initialized control panel, and enabling the monitoring station 108 to respond to information from the control panel if its programming data 33P was validated.

In step 302, the control panel is powered up at a customer site/installation location. Every time a control panel powers up, it executes a set of initial operations.

According to step 304, one of the initial operations upon initialization of the control panel is to send (or signal its standalone communicator 37S to send) information identifying the panel, such as its serial number, and the fingerprint 22P representing the programming data 33P of its panel to the server system 48, via the public network, for example.

In step 306, the server system receives the fingerprint 22P representing the programming data 33P for the control panel to validate the programming data 33P. This validation confirms whether the control panel is properly configured for the current customer site/installed location. The server system 48 compares the received fingerprint 22P to the stored fingerprint 22S representing the stored programming data 33S for the same control panel. The stored fingerprint 22S/stored programming data 33S for the control panel are maintained in the database 44.

According to step 308, the server system 48 determines whether the received fingerprint 22P and the stored fingerprint 22S match. If the fingerprints 22P/22S do not match, the method transitions to step 320. Otherwise, the method transitions to step 310.

If the fingerprints 22P/22S match, in step 310, this indicates that the programming data 33P is validated. In response, in step 312, the server system sends a "go ahead" message instructing the control panel to resume its initialization. The control panel receives the "go ahead" message, resumes its initialization, and continues normal functionality in accordance with its programming data 33P. The fingerprint value 22P representing the programming data 33P is unchanged at the control panel (or standalone communicator 37S connected to the control panel).

Then, in step 314, the server system 48 sends a message to the monitoring station 108. The message enables the monitoring station 108 to act upon or otherwise respond to information sent from the control panel. In one example, this message may be an alarm indicated that the fire alarm panel has detected indications of fire, in which case, the monitoring station will signal or call the local fire brigade.

If the fingerprints 22P/22S do not match, in step 320, the mismatch indicates that the programming data 33P is not validated. This correspondingly indicates that the programming data 33P at the control panel and the stored programming data 33S at the server system 48/database 44 for the same control panel are no longer synchronized. As a result of the mismatch, the server system 48 sends its stored programming data 33S to the control panel, and requests that the control panel update its programming data 33P.

In one embodiment, as shown in step 322, the control panel updates with the received programming data 33S sent from the server system 48, and recalculates its fingerprint 22P value representing the programming data. In one example, the update is accomplished by deleting the local instance of programming data 33P, replacing it with the received programming data 33S, and resuming operation based upon the replaced/received programming data 33P. In this embodiment, in one example, the control panel has a built-in communicator 37 that also supports the ability to calculate the fingerprint 22P representing its programmed data 33P. In another example, the control panel is connected to a standalone communicator 37S, and the standalone communicator 37S recalculates the fingerprint value 22P whenever the programming data 33P of the control panel is modified or updated.

It is also important to note that the control panel in step 322 also handles the case where the programmed data 33P has been modified by an installer or sent from a device other than the server system 48. The control panel recalculates the fingerprint value 22P based upon any change to the programmed data 33P.

In another embodiment, the server system in step 320 sends the stored fingerprint value 22S representing the stored programming data 33S along with the stored programming data 33S. The control panel in step 322 then uses the received fingerprint value 22 thereafter to represent its programming data. This embodiment allows for simpler/faster validation as the control panel may not have the processing power necessary for the calculating the fingerprint value 22P.

According to step 324, the control panel then notifies the server system 48 that the update is complete.

Upon completion of step 324, in one implementation, the control panel also transitions to step 304 to repeat the validation process after the new programming data 33P has been loaded and executed. Here, the control panel will again send information identifying the panel and fingerprint value 22P representing the programming data 33P, in case the stored fingerprint value 22S/stored programming data 22S changed or otherwise could not be processed while the new programming data 33P was storing and updating on the control panel.

Figure 4:
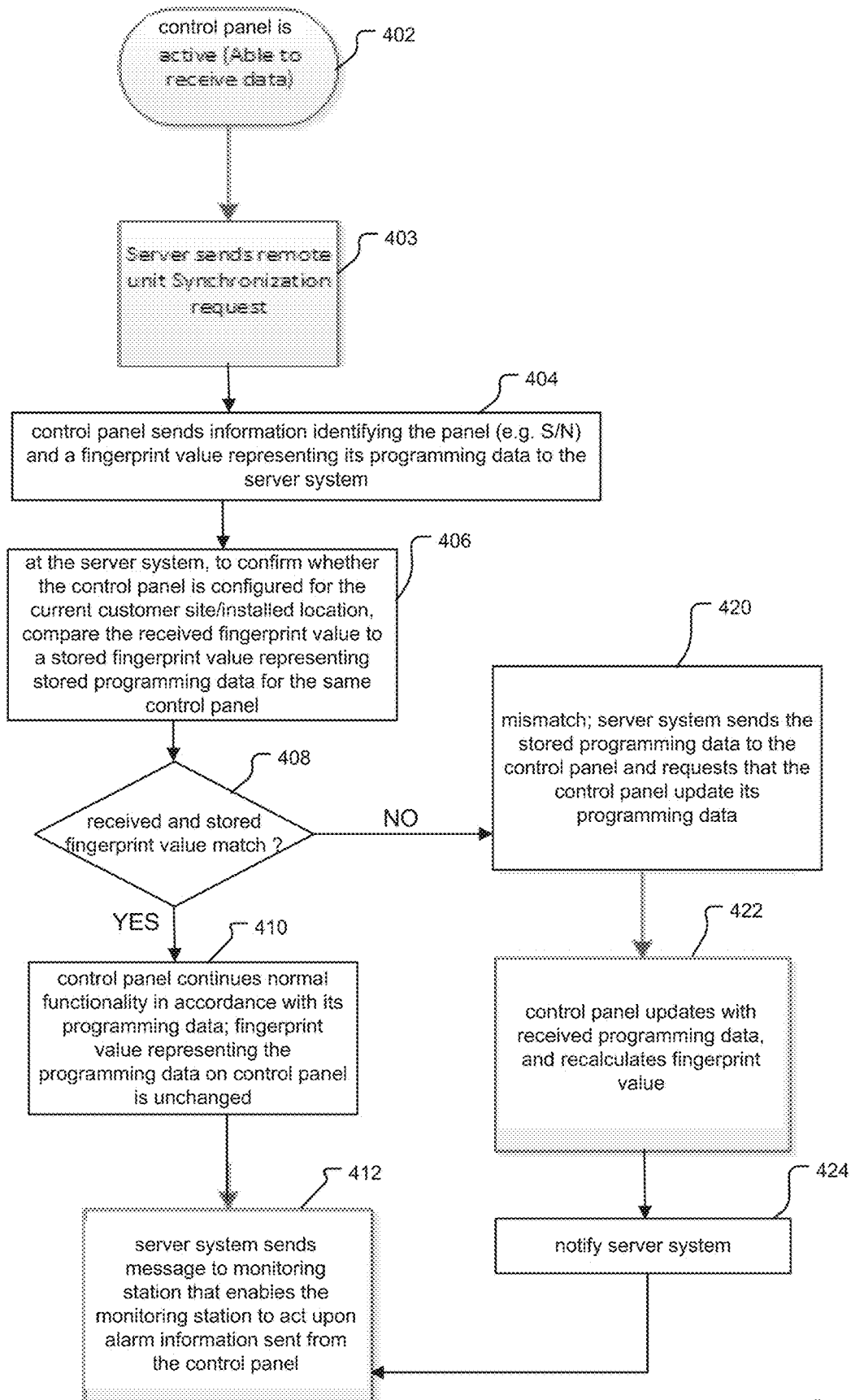
FIG. 4 is a flow diagram showing another method for processing information sent from a control panel, for an initialized and running control panel.

FIG. 4 describes a method for validating programming data 33P of an already running control panel, and enabling the monitoring station 108 to respond to information from the control panel if its programming data 33P was validated.

In step 402, the control panel is running and is able to receive data.

According to step 403, the server system 48 periodically sends a synchronization request to the running control panel. The request specifies that the control panel send the fingerprint representing its programming data to the server system 48 for validation. In one example, this safeguards against changes to the programming data 33P in response to a new activation of the control panel initiated by the server system 48. For example, the server system might send an activation initiation request when a new building owner moves in and requests the monitoring service provided by the monitoring station 108 to be activated, where the previous owner deactivated the service. In another example, this safeguards against a deactivation request, when the building owner is moving or no longer wants the service.

In step 404, the control panel sends information identifying the panel, such as its serial number, and the fingerprint 22P representing the programming data 33P of its panel to the server system 48. This is substantially similar to step 304 in the method of FIG. 3.

In step 406, the server system receives the fingerprint 22P representing the programming data 33P for the control panel to validate the programming data 33P. This validation confirms whether the control panel is properly configured for the current customer site/installed location, for example, and also possibly that the panel is executing the correct firmware version. The server system 48 compares the received fingerprint 22P to the stored fingerprint 22S representing the stored programming data 33S for the same control panel.

The stored fingerprint 22S/stored programming data 33S for the control panel are maintained in the database 44.

According to step 408, the server system 48 determines whether the received fingerprint 22P and the stored fingerprint 22S match. If the fingerprints 22P/22S do not match, the method transitions to step 420. Otherwise, the method transitions to step 410.

If the fingerprints 22P/22S match, in step 410, this indicates that the programming data 33P is validated. The control panel continues normal functionality in accordance with its programming data 33P. The fingerprint value 22P representing the programming data 33P is unchanged at the control panel (or standalone communicator 37S connected to the control panel).

Then, in step 412, the server system 48 sends a message to the monitoring station 108. The message enables the monitoring station 108 to act upon or otherwise respond to information sent from the control panel.

If the fingerprints 22P/22S do not match, in step 420, the mismatch indicates that the programming data 33P is not validated. This correspondingly indicates that the programming data 33P at the control panel and the stored programming data 33S at the server system 48/database 44 for the same control panel are no longer synchronized. As a result of the mismatch, the server system 48 sends its stored programming data 33S to the control panel, and requests that the control panel update its programming data 33P.

In one embodiment, as shown in step 422, the control panel updates with the received programming data 33S sent from the server system 48, and recalculates its fingerprint 22P value representing the programming data. The update is accomplished by deleting the local instance of programming data 33P, replacing it with the received programming data 33S, and resuming operation based upon the replaced/received programming data 33P.

In one example, the control panel has a built-in communicator 37 that also supports the ability to calculate the fingerprint 22P representing its programmed data 33P. In another example, the control panel is connected to a standalone communicator 37S, and the standalone communicator 37S recalculates the fingerprint value 22P whenever the programming data 33P of the control panel is modified or updated.

It is also important to note that the control panel in step 422 also handles the case where the programmed data 33P has been modified by an installer or sent from a device other than the server system 48. The control panel recalculates the fingerprint value 22P based upon any change to the programmed data 33P.

In another embodiment, the server system in step 420 sends the stored fingerprint value 22S representing the stored programming data 33S along with the stored programming data 33S. The control panel in step 422 then uses the received fingerprint value 22 thereafter to represent its programming data. This embodiment allows for simpler/faster validation as the control panel may not have the processing power necessary for the calculating the fingerprint value 22P.

According to step 424, the control panel then notifies the server system 48 that the update is complete. Upon completion of step 424, the method transitions to step 412.

In one example, the method safeguards against local misconfiguration of an already running control panel by an installer, building owner, or other individual with malicious intent, in examples.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for processing alarm information from a control panel in a building management system, comprising:
   receiving, by a server system, from the control panel, identifying information that identifies a location at which the control panel is installed;
   receiving, by the server system, from the control panel, a fingerprint representing programming data of the control panel;
   confirming, by the server system, whether the control panel is properly configured for the location by determining whether the fingerprint matches a stored fingerprint representing stored programming data associated with the location; and
   enabling, by the server system, a monitoring station to respond to the alarm information from the control panel responsive to the fingerprint matching the stored fingerprint.

2. The method of claim 1, wherein the programming data comprises a firmware version that the control panel is executing.

3. The method of claim 1, further comprising sending, by the server system, the stored programming data to the control panel to cause the control panel to update the programming data with the stored programming data.

4. The method of claim 1, further comprising receiving, by the server system from the control panel, a value representing the programming data of the control panel in response to a modification of or updates to the programming data.

5. The method of claim 1, further comprising receiving, by the server system from a communicator connected to the control panel, a value representing the programming data of the control panel in response to a modification of or updates to the programming data.

6. The method of claim 1, wherein the determining and the enabling are performed during an initialization of the control panel, and wherein the initialization resumes subsequent to the determining and the enabling.

7. The method of claim 1, further comprising repeating the method periodically.

8. A system for processing alarm information from a control panel in a building management system, comprising:
   a monitoring station; and
   a server system configured to:
      receive, from the control panel, identifying information that identifies a location at which the control panel is installed;
      receive, from the control panel, a fingerprint representing programming data of the control panel;
      confirming, by the server system, whether the control panel is properly configured for the location by determining whether the fingerprint matches a stored fingerprint representing stored programming data associated with the location; and
      enable the monitoring station to respond to the alarm information from the control panel responsive to the fingerprint matching the stored fingerprint.

9. The system of claim 8, wherein the programming data comprises a firmware version that the control panel is executing.

10. The system of claim 8, wherein the server system is further configured to send the stored programming data to the control panel to cause the control panel to update the programming data with the stored programming data.

11. The system of claim 8, wherein the server system is further configured to receive, from the control panel, a value representing the programming data of the control panel in response to a modification of or updates to the programming data.

12. The system of claim 8, wherein the server system is further configured to receive, from a communicator connected to the control panel, that calculates a value representing the programming data of the control panel in response to a modification of or updates to the programming data.

13. The system of claim 8, wherein the server system is configured to determine whether the fingerprint matches the stored fingerprint and enable the monitoring station to respond to the alarm information from the control panel responsive to the fingerprint matching the stored fingerprint during an initialization of the control panel, wherein the initialization resumes subsequent to the server system determining whether the fingerprint matches the stored fingerprint and enabling the monitoring station to respond to the alarm information from the control panel responsive to the fingerprint matching the stored fingerprint.

14. The system of claim 8, wherein the server system is configured to periodically determine whether the fingerprint matches the stored fingerprint and enable the monitoring station to respond to the alarm information from the control panel responsive to the fingerprint matching the stored fingerprint.

15. A method of operation of a control panel in a building management system, comprising:

during an initialization of the control panel or periodically during an operation of the control panel, sending, to a server system, identifying information that identifies a location at which the control panel is installed, and sending, to the server system, a fingerprint representing programming data of the control panel; and resuming the initialization or the operation of the control panel responsive to the server system confirming whether the control panel is properly configured for the location by determining whether the fingerprint matches a stored fingerprint representing stored programming data associated with the location.

16. The method of claim 15, wherein the programming data comprises a firmware version that the control panel is executing.

17. A control panel in a building management system, comprising:

a microcontroller storing programming data of the control panel; and a communicator for, during an initialization of the control panel or periodically during an operation of the control panel, sending, to a server system, identifying information that identifies a location at which the control panel is installed, and sending, to the server system, a fingerprint representing programming data of the control panel, the control panel configured to resume the initialization or the operation responsive to the server system confirming whether the control panel is properly configured for the location by determining whether the fingerprint matches a stored fingerprint representing stored programming data associated with the location.

18. The method of claim 1, wherein the identifying information comprises customer site information identifying a customer site at which the control panel is installed.

19. The method of claim 1, wherein the identifying information comprises one or more of a serial number of the control panel, a customer name, a customer location or address, a customer account number, a customer personal identification number (PIN), an alarm code used to arm or disarm the control panel, a communication identifier for the control panel and the monitoring station, a media access control (MAC) address, an internet protocol (IP) address, a subscriber identification module (SIM) card number, or dialed number identification service information (DNIS).

20. The method of claim 1, wherein the identifying information comprises a telephone number of a local telephone system to which the control panel is tied.

\* \* \* \* \*